United States Patent [19]

Coussineux

[11] 4,406,165
[45] Sep. 27, 1983

[54] METHOD AND APPARATUS FOR MEASURING THE SPEED OF VEHICLES

[76] Inventor: Henri E. Coussineux, 2 Avenue Van Dyck, 75008 Paris, France

[21] Appl. No.: 338,874

[22] Filed: Jan. 12, 1982

[30] Foreign Application Priority Data

Jan. 13, 1981 [FR] France ............................ 81 00436

[51] Int. Cl.³ .................................................. G01P 3/50
[52] U.S. Cl. ........................................ 73/488; 324/166
[58] Field of Search ............... 73/488, 506; 324/166, 324/178; 367/89, 90

[56] References Cited

U.S. PATENT DOCUMENTS 3,594,755 7/1971 Pijls ..................................... 324/166
4,126,045 11/1978 Chou ..................................... 73/488

OTHER PUBLICATIONS

"Bispectral Passive Velocimeter of a Moving Noisy Machine", by Sato et al from J. Acoustical Soc. of America, Dec. 1980, pp. 1729-1735.

Primary Examiner—James J. Gill
Attorney, Agent, or Firm—A. W. Breiner

[57] ABSTRACT

An apparatus according to the invention includes a vibration sensor put near a traffic lane and for forming an analog signal the frequency values of which are stored when the analog signal is equal to a reference value. The speed is computed from the two stored values.

8 Claims, 3 Drawing Figures

METHOD AND APPARATUS FOR MEASURING THE SPEED OF VEHICLES

FIELD OF THE INVENTION

The present invention relates to a method and an apparatus for measuring the speed of vehicles moving on a road or of crafts moving on water.

BACKGROUND OF THE INVENTION

The speed of vehicles as cars running on roads and as crafts moving on water is sometimes to be measured for checking that speed does not exceed an allowed limit.

PRIOR ART

Known apparatus for measuring speed of vehicles are either mechanical ones, using pneumatic lines, or electromagnetic ones using Doppler radars.

Such apparatus require high capital and maintenance costs and they have not the reliability and secrecy features necessary in the field. In fact, radar apparatus may be detected either visually or with an electromagnetic receiver provided inside a vehicle of which speed is to be measured. Processes involving pneumatic lines or strips may be visually detected and also require significant ground equipment and maintenance.

OBJECTS OF THE INVENTION

One object of the invention is to provide a method and an apparatus for measuring speed of vehicles, especially road vehicles.

Another object of the invention is to measure speed of vehicles with a reliability at least equal to that of known apparatus, but with reduced maintenance, capital and working costs.

SUMMARY OF THE INVENTION

In a first embodiment, an apparatus for measuring vehicle speed includes a vibration sensor for forming an analog signal, an analog-digital converter for receiving said analog signal and for forming a digital signal representative of the vibration frequency, means for comparing said analog signal to a reference signal and for forming a first loading signal when said analog signal becomes equal to said reference signal by increasing and a second loading signal when said analog signal becomes equal to said reference signal by decreasing, first memory means for receiving said digital signal from said converter and for storing the value of said digital signal when first memory means receives said first loading signal, second memory means for receiving said digital signal from said converter and for storing the value of said digital signal when said second memory means receives said second loading signal, computing means for receiving data stored in said first and second memory means and for forming the ratio of the difference and the sum of data of first and second memory means, and means for displaying an information representative of said ratio.

Said vibration sensor is preferably a geophone or an hydrophone, having a range between 3 and 100 Hz. Said sensor is preferably disposed on the ground near a traffic lane.

Said apparatus preferably further includes an amplifier with a pass-band filter.

Comparing means preferably includes a comparator with a logic gate.

In a variant, said displaying means is a printer.

Said apparatus further preferably includes a clock.

In another embodiment, a method for measuring vehicle speed according to the invention includes the steps of sensing vibrations generated by a vehicle and forming an analog signal, converting said analog signal into a digital one representative of the vibration frequency, comparing said analog signal to a reference signal, and forming a first or a second loading signal respectively when said analog signal becomes equal to said reference signal by increasing or by decreasing respectively, storing the digital signal value under control of said first loading signal and said second loading signal, computing the ratio of the difference of the two stored values and of their sum, and displaying an information representative of said ratio.

DETAILED DESCRIPTION OF THE BEST MODE

Figure 1:
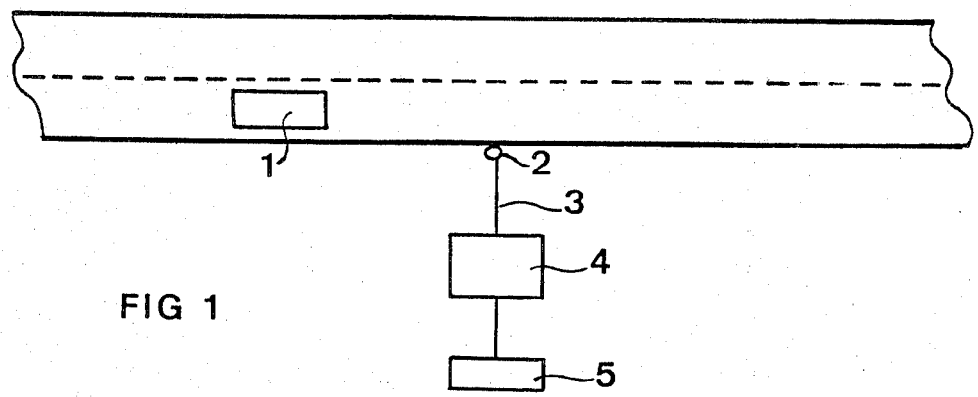
FIG. 1 is a schematic layout of the installation of an apparatus according to the invention.

Referring now to drawings, FIG. 1 generally illustrates the operation of an apparatus according to the invention. Said apparatus is for sensing vibration generated by a vehicle 1, by example a car moving on a road. A vibration sensing and amplifying assembly 2 is put on the ground near the traffic lane 3 and transfers electrical signals from assembly 2 and power to assembly 2. A wired or programmed logic circuit 4 provides for treatment of signals from assembly 2. Display means 5 indicates the measured speed value and gives a real time indication to the operator. So, said value may be recorded, photographically or by a printer.

Figure 2:
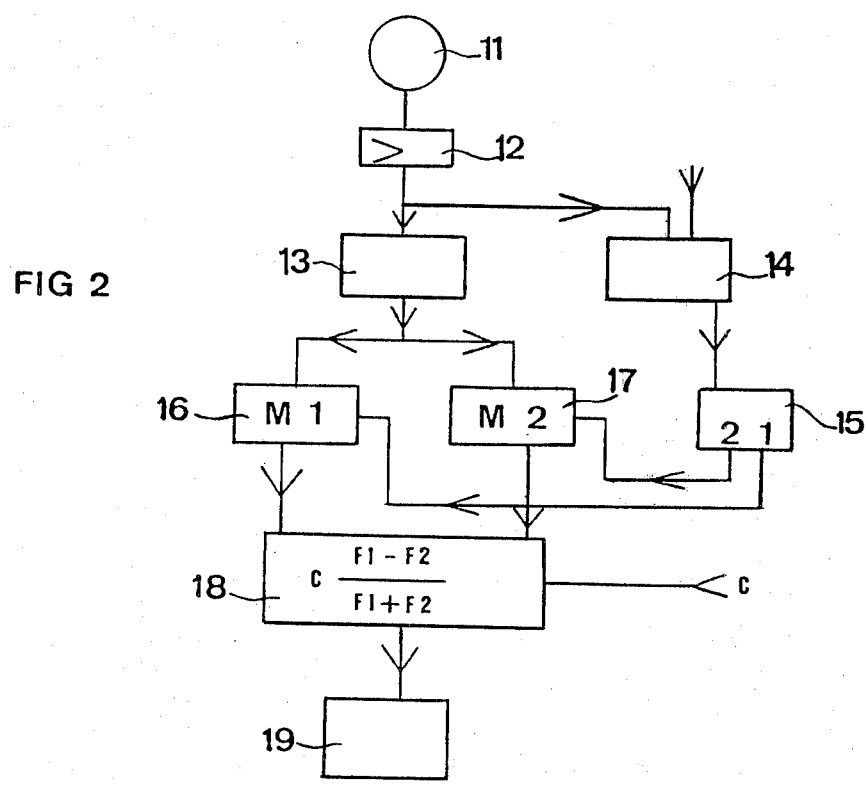
FIG. 2 is a block diagram of an apparatus for measuring vehicle speed according to the invention.

FIG. 2 is a more detailed block diagram of an apparatus according to the invention.

Vibrations generated by a vehicle are sensed by a seismic sensor 11, by example an electrodynamical geophone having a sensible range between 3 and 100 Hz. In an embodiment, said geophone is a ABEM SM1 geophone of Holland. If the vehicle the speed of which is to be measured is a craft moving on the water, sensor 11 is preferably an hydrophone.

The analog signal from sensor 11 is transferred to an amplifier 12. Said amplifier is by example an amplifier AD 101 of Analog Device, providing a gain of 2. Said amplifier is also preferably coupled with a pass-band filter provided for suppressing noise.

The analog signal from amplifier 12 is transferred to an analog-digital converter 13, by example of the type AD 571 of Analog Device forming a signal with 10±1 bits. The analog signal of amplifier 12 is also transferred to a comparator 14 for comparing said analog signal to a reference signal which can be controlled by the operator, by example with a potentiometer (not shown). The output of comparator 14 is connected to the input of a logic gate 15 having two outputs 1 and 2. When the analog signal from amplifier 12 is equal to the reference signal, said comparator transmits a control signal to logic gate 15. So, logic gate 15 transmits a first loading signal by its output 1 when an increasing analog signal becomes equal to said reference signal, and said gate 15 transmits a second loading signal by output 2 when a decreasing analog signal becomes equal to said reference signal as determined by comparator 14.

Loading signals from first and second outputs of logic gate 15 control a first and a second memory 16 and 17 having their inputs connected to the output of converter 13. So, when it receives a loading signal, each memory stores the current value of the digital output signal of said converter 13.

Figure 3:
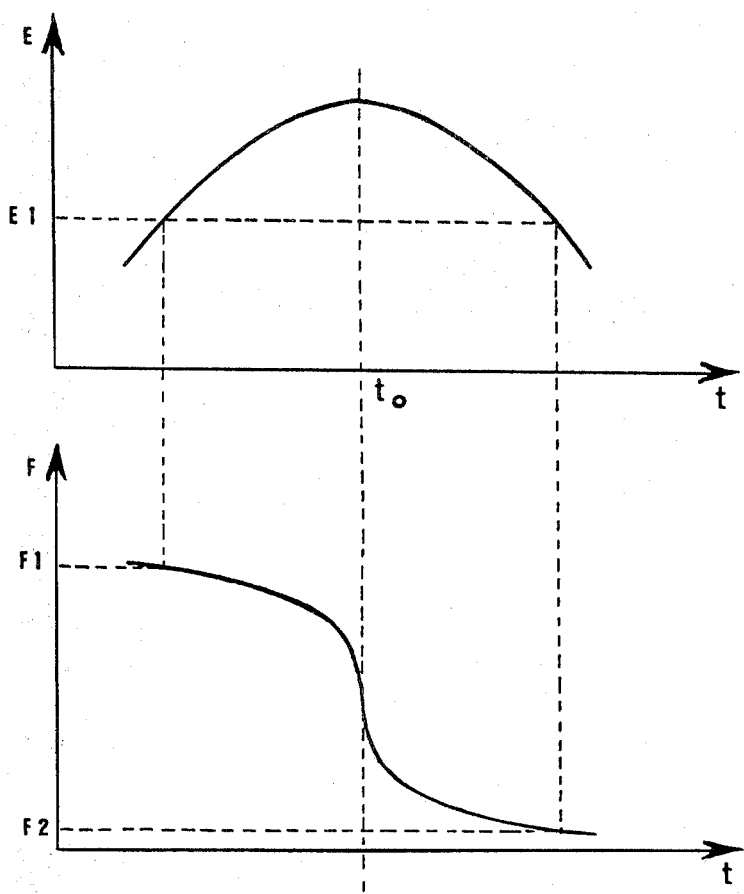
FIG. 3 illustrates curves representative of signals generated in the apparatus of FIG. 2.

Such an operation is illustrated by FIG. 3. The upper curve illustrates the analog signal E and the reference signal E1. The lower curve illustrates the frequency F of the analog signal. The output digital signal of converter 13 is representative of said frequency. So, frequencies F1 and F2 are stored respectively in memory 16 and in memory 17 when the analog signal becomes equal to reference signal E1, by increasing before $t_o$ and decreasing after $t_o$.

In an embodiment, comparator 14 is of the type AD 201/A of Analog Device. Logic gate 15 is a digital logic gate SN 7400 from Texas Instruments. Memories 16 and 17 are each of the type 1024 of Mostek and each has a 8 bits capacity.

A computing circuit 18 receives the outputs of memories 16 and 17 and an adjustable value C and computes the value of $$C \frac{F1 - F2}{F1 + F2}$$

Constant C depends on the seismic wave propagation velocity in the traffic lane. Computing circuit 18 may be a SN 74 191 circuit of Texas Instruments.

Display means 19 receives from computing circuit 18 an information representative of the vehicle speed. Such display means 19 may be a type 7400 series 5082 Hewlett-Packard display having 7 segments.

Moreover, the apparatus includes a clock for clocking the different circuits. Such a clock is by example a SN 1400 clock (10 MHz) of Texas Instruments.

I claim:

1. An apparatus for measuring the speed of a vehicle, including
    vibration sensor for forming an analog signal,
    analog-digital converter for receiving said analog signal and for forming a digital signal respresentative of the vibration frequency,
    comparing means for receiving said analog signal and a reference signal and for forming a first loading signal when said analog signal becomes equal to said reference signal by increasing and a second loading signal when said analog signal becomes equal to said reference signal by decreasing,
    first memory means for receiving said digital signal from said converter and for storing the value of said signal when said first memory receives said first loading signal,
    second memory means for receiving said digital signal from said converter and for storing the value of said signal when said second memory receives said second loading signal,
    computing means for receiving data stored in first and second memory means and for forming the ratio of the difference and the sum of said data, and
    means for displaying an information representative of said ratio.

2. An apparatus according to claim 1, wherein said vibration sensor is a geophone having a sensible range between 3 and 100 Hz.

3. An apparatus according to claim 1 or claim 2, wherein said sensor is to be put on the ground near a traffic lane.

4. An apparatus according to claim 1 further including amplifier and filtering means for receiving said analog signal.

5. An apparatus according to claim 1, wherein said comparing means includes a comparator and a digital logic gate.

6. An apparatus according to claim 1, wherein said display means further includes a printer.

7. An apparatus according to claim 1, further including a clock.

8. A method for measuring the speed of a vehicle, including the steps of
    sensing vibrations generated by said vehicle and forming an analog signal representative of said vibrations,
    converting said analog signal into a digital one representative of the vibration frequency,
    comparing said analog signal to a reference signal and forming a first loading signal when said analog signal becomes equal to said reference signal by increasing and a second loading signal when said analog signal becomes equal to said reference signal by decreasing,
    storing values of said digital signal under control of said first loading signal and said second loading signal,
    computing the ratio of the difference and of the sum of the two stored values, and
    displaying an information representative of said ratio.

* * * * *